Sept. 16, 1969  C. LOWERY  3,467,199
COMBINATION LEVELER, ROOT CUTTER AND HARROW
Filed July 14, 1966
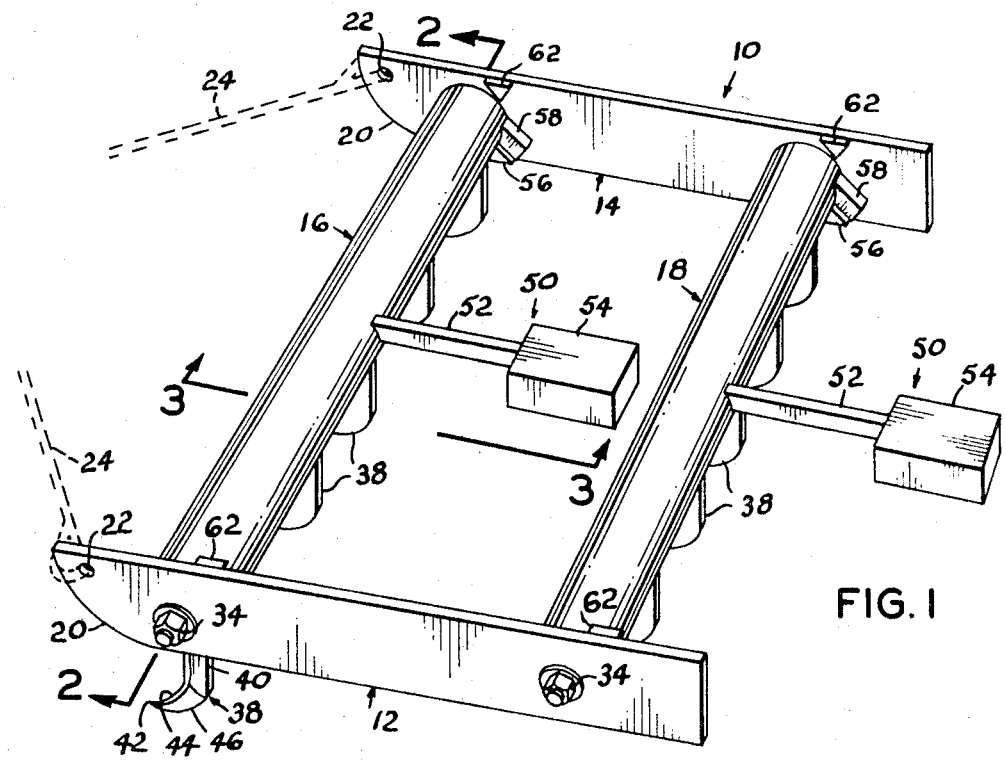
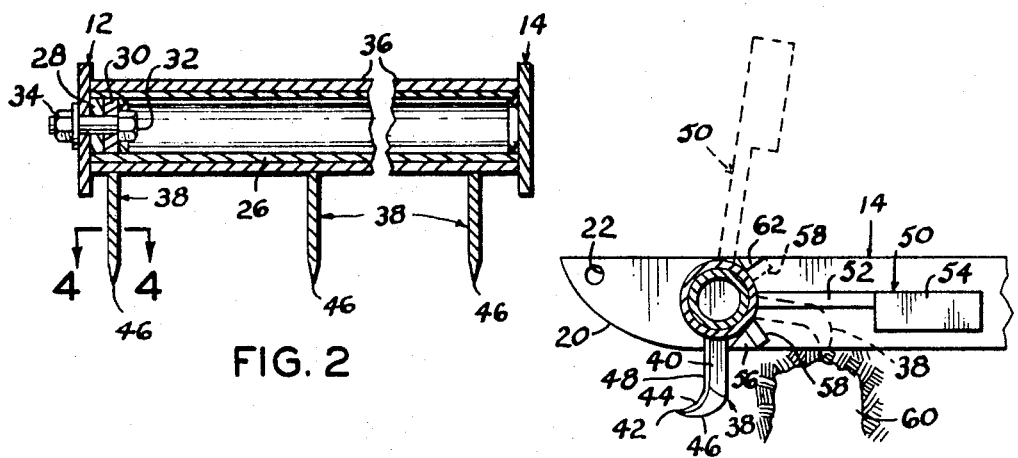
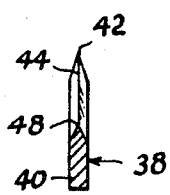
CHARLEY LOWERY
*INVENTOR.*
BY
*Robert K. Rhea*
AGENT

United States Patent Office 3,467,199
Patented Sept. 16, 1969

3,467,199
COMBINATION LEVELER, ROOT CUTTER AND HARROW
Charley Lowery, Box 13, Briartown, Okla. 74424
Filed July 14, 1966, Ser. No. 565,231
Int. Cl. A01b 61/00, 23/00, 35/20
U.S. Cl. 172—261       4 Claims

ABSTRACT OF THE DISCLOSURE

A pair of plate-like sled runner-like supports are interconnected in parallel spaced relation by parallel arbors, each having a surrounding sleeve rotatable around the arbor between stops. Root cutting blades depend from the sleeves in parallel relation. A counterweight, attached to each sleeve, maintains the blades vertical.

---

The present invention relates to soil preparation and more particularly to a combination leveler, root cutter and harrow.

After trees and brush have been cleared from a field prior to preparing the soil for planting, a large number of roots are usually left within the soil which hinders plowing and the preparation of the seed bed.

It is, therefore, the principal object of this invention to provide a relatively inexpensive harrow-like implement which will level and loosen the soil while simultaneously cutting roots therein.

Another object is to provide a device of this class which, during the soil loosening and root cutting action, is provided with means for passing over a buried obstruction which does not affect the subsequent action of the device.

Another object is to provide a device of this class which may be easily modified to provide soil loosening and small weed clearing harrow-like teeth.

The present invention accomplishes these and other objects by arbors interconnecting a pair of supports in spaced relation. A row of soil penetrating means is connected to the arbor in depending relation while counterweight means normally maintains the soil penetrating means in position.

Other objects will be apparent from the following description when taken in conjunction with the accompanying single sheet of drawings, wherein:

FIGURE 1 is a perspective view of the device;
FIGURES 2 and 3 are vertical cross-sectional views taken substantially along the lines 2—2 and 3—3, respectively, of FIG. 1; and
FIGURE 4 is a horizontal cross-sectional view, to a different scale, taken substantially along the line 4—4 of FIG. 2.

Like characters of reference designate like parts in those figures of the drawings in which they occur.

In the drawings:

The reference numeral 10 indicates the device, as a whole, comprising a pair of supports 12 and 14 interconnected in parallel spaced-apart relation by arbors 16 and 18. The supports 12 and 14 are elongated rectangular plate-like in general configuration with one longitudinal side edge disposed downwardly. One end surface of each support is rounded off to merge with the depending side edge, as at 20, so that the supports are sled runner-like in appearance. The arcuate end surface 20 thus defines a forward end of the support which is drilled, as at 22, to provide means for attaching a chain or cable, as indicated by the dotted lines 24, for towing the device 10 across the surface of the earth.

The arbors 16 and 18 are identical in construction and in the interest of brevity only the arbor 16 will be described in detail.

The arbor 16 comprises a central cylindrical member such as a tube 26 which is abutted, at one end, against the inner forward surface of the support 14 and rigidly secured thereto as by welding. A circular plate 28, diametrically substantially equal to the inside diameter of the tube 26, is secured, as by welding, to the inner forward surface of the support 12 in coaxial alignment with the tube 26. The plate 28 thus forms a support for the adjacent end of the tube 26. A disk 30 is secured within the tube 26 inwardly of the plate 28. The disk 30, plate 28 and support 12 are line drilled for receiving a bolt 32 which projects outwardly of the support 12 and is secured by a nut and washer 34 thus removably connecting the tube 26 to the support 12.

A sleeve 36 rotatively surrounds the tube 26 and is coextensive therewith. A plurality of teeth or blades 38 are secured, as by welding, to the periphery of the sleeve 36 in spaced-apart depending relation longitudinally of the sleeve. Each of the blades 38 includes a shank portion 40 and terminates, at its depending end, in a forwardly extending tip or point 42 defined by arcuate forwardly converging upper and lower surfaces 44 and 46, respectively. The leading edge of the shank portion 40 and the arcuate upper surface 44 are sharpened to form a cutting edge, as at 48 (FIG. 4). Similarly the depending arcuate surface 46 is sharpened.

The blades 38 are maintained in depending soil penetrating and root cutting position by counterweight means 50 comprising an elongated arm 52 rigidly connected at one end to the periphery of the sleeve 36 intermediate its ends. The arm 52 projects horizontally rearward and has secured at its other end a weight 54. The counterweight means 50 thus tends to rotate the sleeve 36 in a clock-wise direction, as viewed in FIG. 3. To maintain the counterweight arm 52 horizontal and the shanks of the blades 38 vertical, a first or lower stop 56 is secured to the inner depending edge portion of the supports 12 and 14 adjacent the periphery of the sleeve 36. A shank 58 is rigidly connected to the periphery of the sleeve adjacent the inner surface of the respective support which contacts the stop 56, as shown by solid lines (FIGS. 1 and 3). When one or more of the blades 38 contact a buried object, such as a rock or stump 60, the affected blade or blades rotate the sleeve around the tube 26, in a counter-clockwise direction, as viewed in FIG. 3, thus lifting the counterweight means 50, as shown by dotted lines. To insure that the sleeve 36 does not rotate beyond 90°, a second or upper stop 62 is secured to the inner surface, adjacent the upper edge, of the respective support 12 and 14 which engages the shaft 58 and limits the rotative movement of the sleeve 36. After passing over the obstruction 60 the counterweight means returns the blades 38 to their normal cutting position by gravity. The blades 38, on the arbor 18, are positioned in spaced-apart staggered relation with respect to the blades 38 on the arbor 16.

OPERATION

In operation one or more of the devices 10 is assembled, as described hereinafter, and connected with a towing vehicle, not shown. During forward movement the mass of the device 10 and the cylindrical configuration of the arbors 12 and 14 tends to level uneven loose soil while simultaneously the soil penetrating blades 38 sever relatively small roots. Obviously other type blades, such as conventional harrow teeth, not shown, may be attached to similar sleeves and positioned on the tube 26 in place of the sleeves 36 by removing the nuts and washers 34. Similarly more than two arbors may be employed if desired.

I claim:
1. A harrow, comprising: a pair of spaced-apart plate-like vertically disposed edgewise supports, each provided with an arcuate forward surface, one said support having a pair of transverse apertures; a pair of arbor means, each said arbor means comprising a tube extending between and connected at one end with one said support, a disk coaxially secured within the other end portion of said tube, a bolt coaxially extending through said disk and a respective one of the apertures in said one support, and a sleeve rotatably surrounding said tube; root cutting means connected to each said sleeve; and a counterweight means secured to each said sleeve.

2. Structure as specified in claim 1 in which said root cutting means comprises a row of spaced-apart blades, each having a vertical shank portion terminating at its depending end in an arcuate forwardly extending sharpened edge.

3. Structure as specified in claim 2 and stop means limiting rotative movement of said sleeve, said stop means comprising a pair of spaced-apart stops connected with said supports adjacent one end of said sleeve, and a shank secured to said sleeve and engaging said stops in response to rotative movement of said sleeve.

4. Structure as specified in claim 3, in which said counterweight means comprises an arm horizontally connected at one end to said sleeve and projecting rearwardly therefrom, and a weight connected to the other end of said arm.

References Cited

UNITED STATES PATENTS

| | | | |
|---|---|---|---|
| 238,533 | 3/1881 | Scobie | 172—620 |
| 462,059 | 10/1891 | Pehrson | 172—635 |
| 520,363 | 5/1894 | Kirven | 172—369 |
| 1,209,565 | 12/1916 | Dickinson | 172—657 X |
| 3,255,831 | 6/1966 | Kirkpatrick | 172—620 X |

ROBERT E. PULFREY, Primary Examiner

R. C. HARRINGTON, Assistant Examiner

U.S. Cl. X.R.

172—393, 611, 766